US012783180B2

(12) United States Patent
Nakagawa

(10) Patent No.: US 12,783,180 B2
(45) Date of Patent: Nov. 3, 2026

(54) INFORMATION PROCESSING APPARATUS, METHOD AND COMPUTER-READABLE STORAGE MEDIUM TO IDENTIFY LOCATION OF CLIENT TERMINAL FOR PRINTING DOCUMENT AT IMAGE FORMING APPARATUS VIA TENANT SERVER

(71) Applicant: CANON KABUSHIKI KAISHA, Tokyo (JP)

(72) Inventor: Masashi Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 18/648,558

(22) Filed: Apr. 29, 2024

(65) Prior Publication Data

US 2024/0377992 A1 Nov. 14, 2024

(30) Foreign Application Priority Data

May 8, 2023 (JP) ................................. 2023-076895

(51) Int. Cl.
*G06F 3/12* (2006.01)

(52) U.S. Cl.
CPC .......... *G06F 3/1203* (2013.01); *G06F 3/1222* (2013.01); *G06F 3/1238* (2013.01); *G06F 3/126* (2013.01); *G06F 3/1287* (2013.01); *G06F 3/1288* (2013.01); *G06F 2209/541* (2013.01)

(58) Field of Classification Search
None
See application file for complete search history.

(56) References Cited

U.S. PATENT DOCUMENTS 9,936,001 B2 * 4/2018 McGrath ............... G06F 9/5072
2012/0157795 A1 * 6/2012 Chiu ....................... G16H 40/67 370/259
2023/0062471 A1 * 3/2023 Hasegawa .......... H04N 1/00233
2023/0109350 A1 * 4/2023 Tanibe .................. G06F 3/1204 358/1.14

FOREIGN PATENT DOCUMENTS

JP 2014049059 A 3/2014

* cited by examiner

*Primary Examiner* — Haris Sabah
(74) *Attorney, Agent, or Firm* — Venable LLP

(57) ABSTRACT

An information processing apparatus is provided. The apparatus, in response to a request for an output-enabled tenant list by a user, identifies a location of a client terminal corresponding to a transmission source of the request, in a case where the location is determined to be a location of a specific tenant, obtains a condition for an output-enabled tenant set for the specific tenant, and filters a list of output-enabled tenants usable by the user on a basis of the condition to generate an output-enabled tenant list and transmits the output-enabled tenant list to the client terminal.

11 Claims, 10 Drawing Sheets

FIG. 6

| User | Display Name | Mail Address | User ID | Tenant |
|---|---|---|---|---|
| User A | AAAA<br>aaaa | aaaa@123.com | A1111111 | Company A<br>Company B<br>Convenience store<br>Home |
| User B | BBBB<br>bbbb | bbbb@456.co.jp | B2222222 | Company A<br>Coworking office<br>Home |
| User C | CCCC<br>cccc | cccc@789.com | C3333333 | CompanyB<br>Convenience store |

INFORMATION PROCESSING APPARATUS, METHOD AND COMPUTER-READABLE STORAGE MEDIUM TO IDENTIFY LOCATION OF CLIENT TERMINAL FOR PRINTING DOCUMENT AT IMAGE FORMING APPARATUS VIA TENANT SERVER

BACKGROUND OF THE INVENTION

Field of the Invention

The present invention relates to printing in a cloud printing service and particularly relates to an information processing apparatus, a control method therefor, a medium, and a printing system.

Description of the Related Art

Cloud printing services in which a print job is input to an image forming apparatus via a cloud server have recently started to become more common. In a cloud printing service, firstly, the administrator of the image forming apparatus registers an image forming apparatus with a tenant of the cloud printing service. The user, after being issued with an account for the tenant, registers a client terminal with the tenant. Accordingly, a print job can be transmitted from the client terminal to the image forming apparatus via the cloud printing service. With this configuration, a print job transmitted from the client terminal can be executed from any image forming apparatus registered with the tenant.

Also, due to the increased variety in how people work, the number of companies that promote working in one company while having a second job with a different company or a side business has increased, and there is a demand to be able to print a document on one company's client terminal from an image forming apparatus installed in another company. Also, due to an increase in teleworking, there is a demand to be able to print a document on one's own client terminal from an image forming apparatus installed in a public space such as a shared office or convenience store. In such cases, printing is typically performed using a printing system compatible with each of the applications including a company, a shared office, and a convenience store. Each printing system has a compatible method for inputting print jobs. This method, for example, may be a printer driver, drag & dropping a file from a web browser, attaching a print job to be input to an email, or the like. The method for inputting a print job using a printer driver also needs to change depending on the application. The user needs to decide in advance which application will be used and select the compatible print job input method, all of which is very troublesome.

Also, in a case where printing is performed using a cloud printing service, the expense for using the cloud printing service must be paid. In Japanese Patent Laid-Open No. 2014-49059, a method is disclosed for determining the payer (or the bearer) of the expense relating to use of device by causing the user to set the settings to private purpose or public purpose on a print settings screen.

With known techniques, the user is caused to select public use or private use on a print settings screen, and whether the printing expense is to be paid by the company or a worker is determined on the basis of log data generated on the basis of this setting. However, in the case of printing for public use using a public printing service in which a plurality of cloud printing services can be registered, it can be impossible to determine whether the usage was for company A or for company B, for example. Also, with the known techniques, the user chooses the payer of the expense, making management unable to be performed on the side of company A or company B. There is also the concern of data to be printed being able to be output to an image forming apparatus outside of the company.

SUMMARY OF THE INVENTION

According to the present invention, a tenant administrator can restrict the tenants that a user can output a print job from, allowing the payer of the printing expense and the used image forming apparatus to be managed.

According to an aspect of the present invention, provided is an information processing apparatus, comprising: a communication unit; at least one memory storing at least one program; and at least one processor, wherein the at least one processor reads out the at least one program from the at least one memory and executes the at least one program to in response to a request for an output-enabled tenant list by a user, identify a location of a client terminal corresponding to a transmission source of the request, in a case where the location is determined to be a location of a specific tenant, obtain a condition for an output-enabled tenant set for the specific tenant, and filter a list of output-enabled tenants usable by the user on a basis of the condition to generate an output-enabled tenant list and transmit the output-enabled tenant list to the client terminal.

According to another aspect of the present invention, provided is a printing system, comprising: an information processing apparatus; a client terminal; and a printing service set with a specific tenant, wherein the information processing apparatus includes a communication unit, at least one memory storing at least one program, and at least one processor, and the at least one processor reads out the at least one program from the at least one memory and executes the at least one program to in response to a request for an output-enabled tenant list by a user, identify a location of the client terminal corresponding to a transmission source of the request, in a case where the location is determined to be a location of a specific tenant, obtain a condition for an output-enabled tenant set for the specific tenant from the printing service, and filter a list of output-enabled tenants usable by the user on a basis of the condition to generate an output-enabled tenant list and transmit the output-enabled tenant list to the client terminal.

A tenant administrator can restrict the tenants that a user can output a print job from, allowing the payer of the printing expense and the used image forming apparatus to be managed.

Further features of the present invention will become apparent from the following description of exemplary embodiments with reference to the attached drawings.

BRIEF DESCRIPTION OF THE DRAWINGS

FIG. 6 is a diagram illustrating an example of a user information list stored in a CPS 240 upon user registration according to the first embodiment.

DESCRIPTION OF THE EMBODIMENTS

Figure 1:
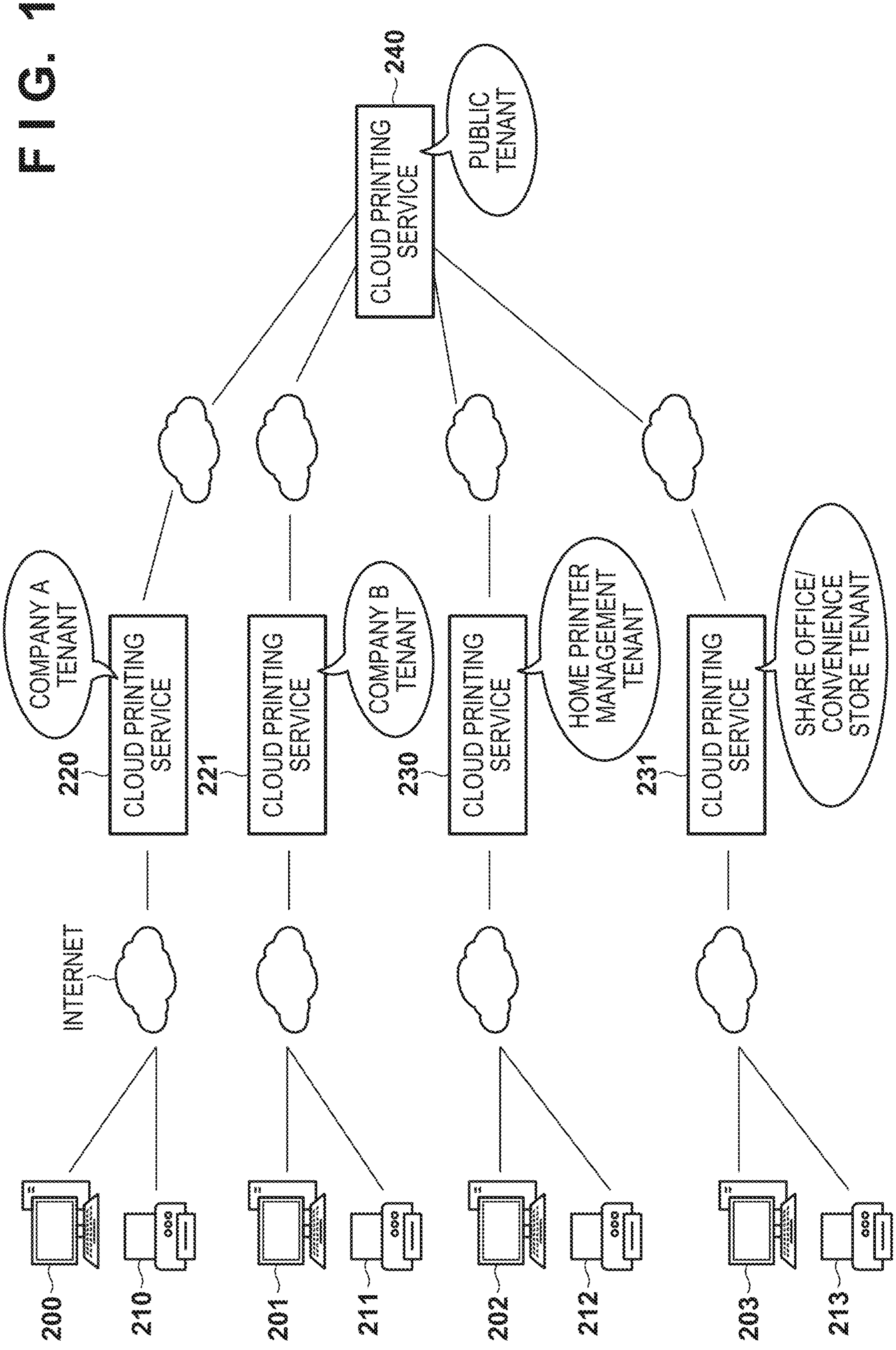
FIG. 1 is a configuration diagram of a cloud printing service according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Firstly, the first embodiment of the invention will be described.

System Configuration

FIG. 1 illustrates the configuration of a cloud printing service system according to the first embodiment of the present invention. Client terminals 200, 201, 202, and 203 are each client terminals that input print jobs to a cloud printing service (CPS). Image forming apparatuses 210, 211, 212, and 213 are each image forming apparatuses that obtain print jobs from a CPS and execute a printing process. CPSs 220 and 221 are CPSs that receive a print job from the client terminals 200 and 201 and transmit a printing result log to a CPS 240. CPSs 230 and 231 are CPSs that receive a print job from the client terminals 202 and 203 and transmit a print job to the CPS 240. The CPS 240 is a CPS that receives a printing result log from the CPSs 220 and 221 and receive a printing result log from the CPSs 230 and 231.

Each component described above is communicatively connected via a network. The network may be any one of a LAN or WAN such as the Internet, a telephone line, a dedicated digital line, an ATM, or the like. Also, the communication network may be implemented via a combination of these. It is sufficient that the network allows for the transmitting and receiving of data.

Hardware Configuration

Figure 2:
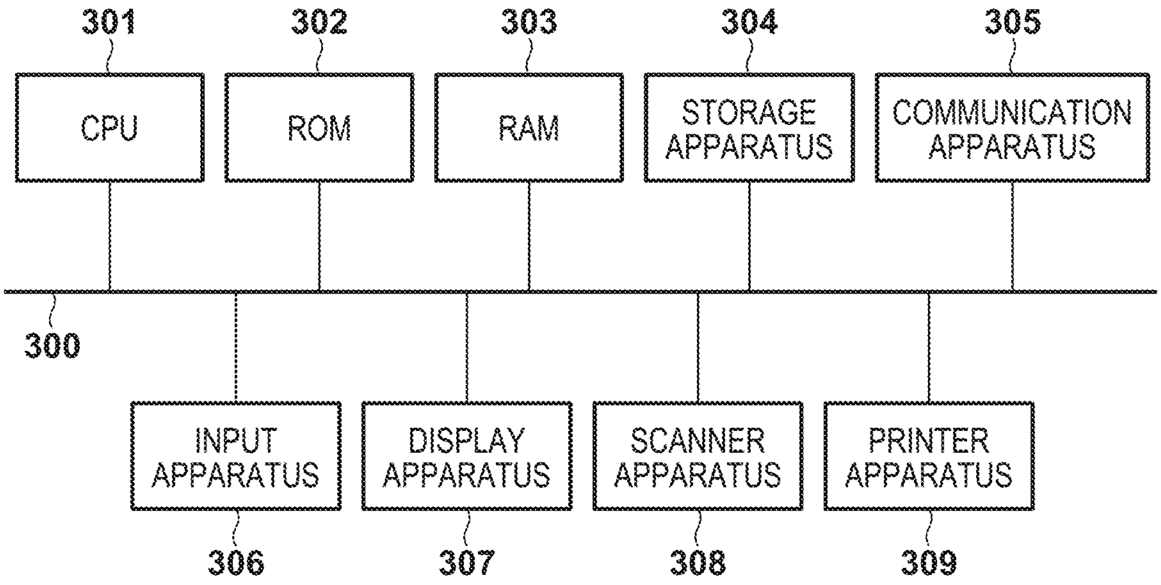
FIG. 2 is a block diagram illustrating an example of the hardware configuration of the cloud printing service according to the first embodiment.

FIG. 2 is a block diagram illustrating an example of the hardware configuration of the client terminals 200 to 203, the image forming apparatuses 210 to 213, and the CPSs 220, 221, 230, 231, and 240 illustrated in FIG. 1. A typical information processing apparatus hardware configuration can be applied to the client terminal and image forming apparatus according to the present embodiment. However, a scanner apparatus 308 and a printer apparatus 309 may not be included in the client terminal and the CPS.

A CPU 301 comprehensively controls each piece of hardware, controls each unit connected to a bus 300, and executes each function such as printing and scanning, for example. ROM 302 is a data read-only memory and stores a basic control program of the image forming apparatus, for example. RAM 303 is a data read/write memory that is used as the working memory of the CPU 301, for example.

A storage apparatus 304 is used as a storage area for temporary data during execution of each program and persistent data. For example, the storage apparatus 304 commonly used is an HDD, but any apparatus that can be loaded with external media, such as an SSD, CD, DVD, or memory card, and that can read and write data can be used.

A communication apparatus 305 connects the client terminals 200 to 203, the image forming apparatuses 210 to 213, and the CPSs 220, 221, 230, 231, and 240 to the LAN or Internet and can perform data communication between the apparatuses via TCP/IP.

An input apparatus 306 is an operation unit for accepting an input operation of characters or data from a user. For example, a keyboard, a mouse, physical keys, or a touch panel is used.

A display apparatus 307 is an apparatus for displaying various types of screens and may be a liquid crystal display or a touch panel, for example. The user issues instructions via the input apparatus 306 on the user interface screen displayed on the display apparatus 307 and issues a job execution instruction to the CPS 230.

In the image forming apparatuses 210 to 213, the scanner apparatus 308 and the printer apparatus 309 are also connected to the bus 300.

Software Configuration

Figure 3:
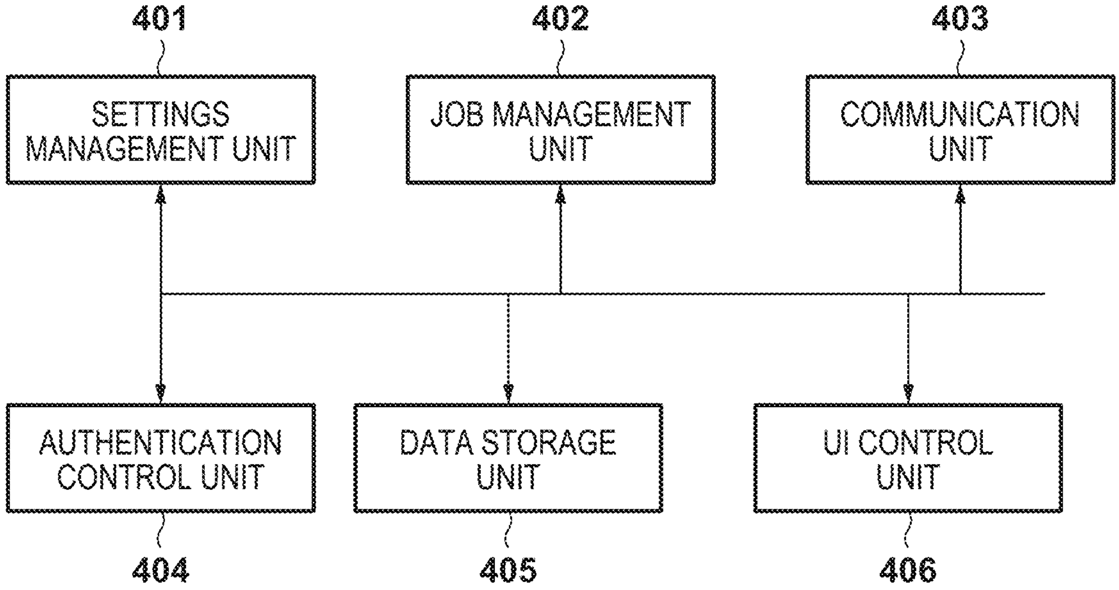
FIG. 3 is a block diagram illustrating an example of the software configuration of the cloud printing service according to the first embodiment.

FIG. 3 is a block diagram illustrating an example of the software configuration of the CPS 240 according to the first embodiment. The software configuration illustrated in FIG. 3 is implemented by the CPU 301 reading out a program stored in the ROM 302 to the RAM 303 and executing the program.

A settings management unit 401 stores settings relating to the various types of functions of the CPS 240 in the storage apparatuses such as the RAM 303 or the storage apparatus 304 and reads out the settings from the storage apparatuses. A job management unit 402 stores print jobs received from the CPS 230 and 231 in a data storage unit 405. A communication unit 403 mainly transmits and receives print jobs, but also transmits and receives user information and post-print-completion reports. When a print job obtaining request is received from the CPS 220 and 221, the communication unit 403 obtains the corresponding print job from the CPS 240 and transmits the corresponding print job to the CPS 220 and 221. A UI display unit 406 performs display when registering a tenant with the CPS 240, when registering a user, and when displaying print job status confirmation and reports.

Flow of User Registration

Figure 4:
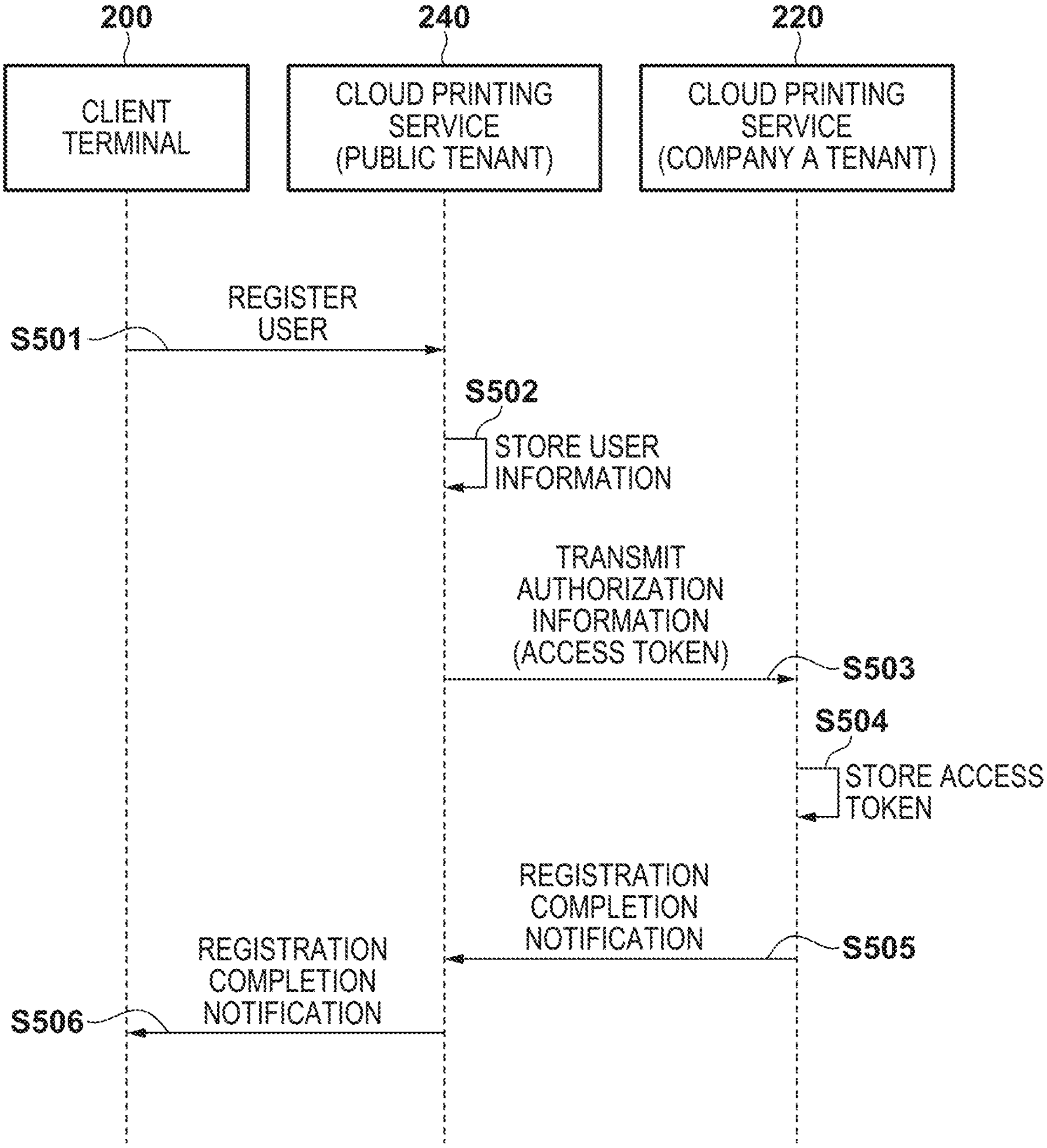
FIG. 4 is a flow diagram (1 of 2) of user registration for a public tenant according to the first embodiment.

FIG. 4 illustrates the flow of user registration for a public tenant according to the first embodiment. Note that in the present example, a tenant can also be referred to as a virtual CPS for each customer, and thus a distinction may not be made between the CPS and the tenant belonging thereto in the following description. Also, in the following description, for the sake of convenience the tenant of company A and the tenant of company B may be referred to as an in-company tenant of each company. Also, a tenant of a shared office may be referred to as a shared office tenant, a tenant of a private home may be referred to as a home printer management tenant (home management tenant), and a tenant for using an image forming apparatus installed in a convenience store may be referred to as a convenience store tenant. A CPS for using an image forming apparatus associated with a tenant relating to management of an image forming apparatus installed in a public space, such as a convenience store, a library, or a train station, may be referred to as a public printing service. Also, a tenant in which a plurality of CPSs (tenants) are registered as users may be referred to as a public tenant or cooperating tenant. With a public tenant, a user belonging to a certain tenant can use the resources of another tenant that is a registered user of the public tenant.

In FIG. 4, the CPS 220 is registered with the CPS 240, which is a public tenant, as a user affiliated with the in-company tenant of company A (company A tenant). The CPS 221, the CPS 230, and the CPS 231 also need to be registered in a similar manner. Herein, it is premised that each tenant is already registered with the CPS 240, which is a public tenant.

The company A tenant is a company tenant that is obtained by company A via a contract with the provider of the CPS, and users that are granted use permission by company A are registered and image forming apparatuses prepared by company A are registered. Thus, company A can manage the users and image forming apparatuses registered with the tenant. On the other hand, in a tenant providing a public printing service such as a convenience store tenant, an image forming apparatus installed in a public place such as a convenience store, library, or train station is registered. Such tenants are referred to as public tenants. Registered users of such tenants can use the resources registered with the tenant. In the present example, an in-company tenant and a convenience store tenant are registered with the public tenant CPS 240, and the in-company tenant user can use the image forming apparatus and the like of the convenience store tenant. The method for registering a user with the public tenant CPS 240 may be one of the following two methods which will be described using the flows illustrated in FIGS. 4 and 5.

FIG. 4 illustrates a method for registering a user directly with the public tenant CPS 240 from the client terminal 200 bypassing the in-company tenant of company A (company A tenant). The tenant user logs into the CPS 240 from the client terminal 200 and performs a user registration request (S501). Having received the user registration request, the CPS 240 stores the received user information in its tenant (S502). If there is affiliated CPS information (affiliated tenant information) at the time of user registration, the user in question is also registered with the corresponding CPS. In FIG. 4, the user is affiliated with the company A tenant, and the flow is also used when registering with the company A tenant. The CPS 240 issues authorization information (also referred to as an access token) based on the received user information. The CPS 240 transmits the issued authorization information to the CPS 220 also and performs a registration request (S503). Having received the registration request, the CPS 220 newly adds the user to its user information storage area and stores the authorization information (S504) and sends a completion notification to the CPS 240 (S505). Having received the completion notification, the CPS 240 sends a completion notification to the request source client terminal 200 (S506). The CPS 220 uses the access token associated with each user when accessing the CPS 240. The CPS 240 authorizes user access if the access token is correct.

Figure 5:
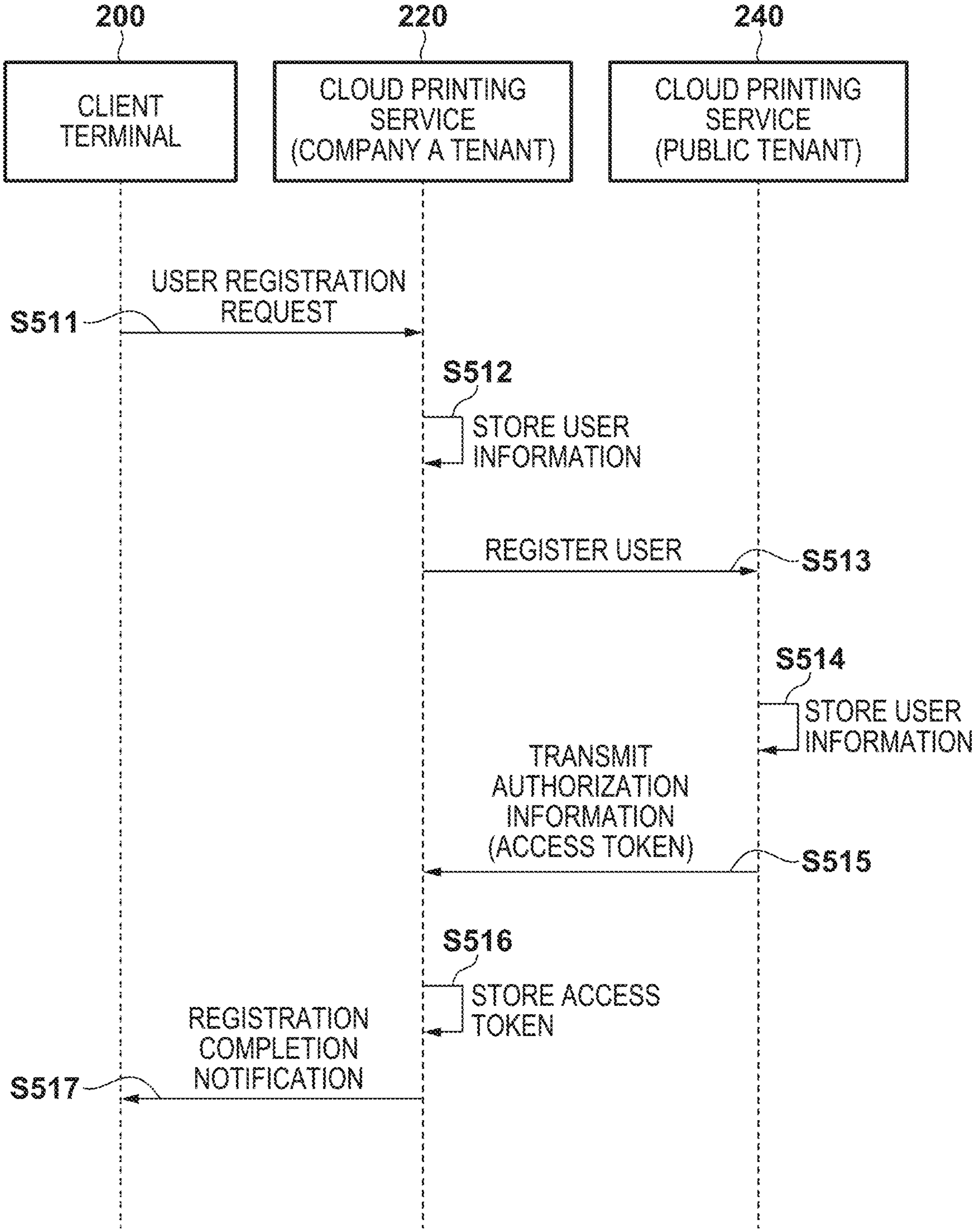
FIG. 5 is a flow diagram (2 of 2) of user registration for a public tenant according to the first embodiment.

FIG. 5 illustrates a method for registering with the public tenant CPS 240 via the company A tenant or the like. The operations in the example of FIG. 5 are performed mainly by the tenant administrator. The tenant administrator transmits the user information from the client terminal 200 to the CPS 220 and requests user registration (S511). Having received the user registration notification, the CPS 220 stores the user information (S512) and requests the public tenant CPS 240 for user registration (S513). Having received the registration request, the CPS 240 newly adds the user to its user information storage area and stores the received user information (S514). The CPS 240 issues authorization information and transmits authorization information (an access token) together with a completion notification to the CPS 220 (S515). Having received the completion notification, the CPS 220 stores the received access token (S516) and sends the completion notification to the request source client terminal 200 (S517).

FIG. 6 illustrates an example of user information stored in the CPS 240 in user registration. In this example, a list of usable tenants is associated with users. The stored user information includes a user name for display, an email address, user identification information (ID), and information indicating affiliated tenants. In addition, the access token obtained via the process illustrated in FIG. 4 or FIG. 5 may also be stored for each user.

Printing Flow

Figure 7:
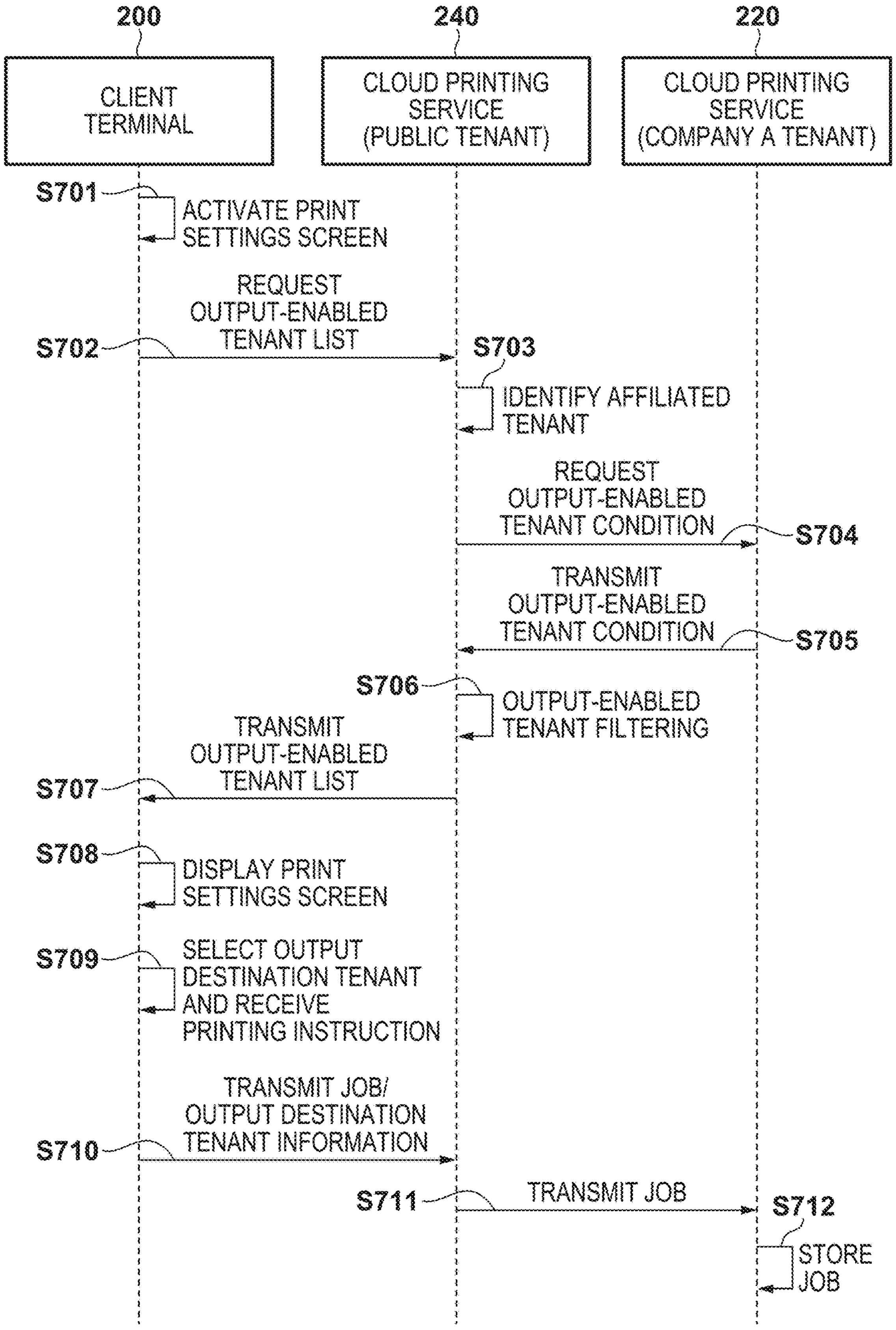
FIG. 7 is a flow diagram illustrating a printing execution process according to the first embodiment.

FIG. 7 is a flow diagram illustrating the printing execution process according to the first embodiment. The present example is premised on a print job being input to the CPS 220 set as the company A tenant.

First, a print settings screen of the print driver is activated from a typical application being executed on the client terminal 200 by the user (S701). The client terminal 200 requests a list (an output-enabled tenant list) of tenants associated with the client terminal 200 from the public tenant CPS 240 (S702). The client terminal 200 simultaneously transmits its location information when requesting the output-enabled tenant list. The location information is information for determining or identifying where the user is trying to execute printing from. For example, the location information may be its IP address or position information (for example, position information identified by GPS). Also, printer driver obtains specific in-company information set in advance in the client terminal 200, and the information can also be transmitted to the CPS 240 together with the print job. Information such as the user ID and the like of the user logged in at the time of the output-enabled tenant list request may also be transmitted.

Having received the request, the CPS 240 identifies the affiliated tenant of the client terminal 200 from the location information of the request source client terminal 200 (S703). The CPS 240 requests an output-enabled tenant condition from the identified tenant (S704). In the present example, from the location information of the client terminal 200, the client terminal 200 is identified as being affiliated with the company A tenant. Here, the CPS 240 requests the output-enabled tenant condition from the company A tenant CPS 220 (S704). At this time, user authentication is also performed by the CPS 220. This user authentication may use the user ID or the like. Alternatively, the access token issued by the CPS 220 during the process illustrated in FIG. 4 or FIG. 5 and transmitted to the CPS 240 may be used, for example. Regarding how the affiliation of the client terminal 200 is identified will be described below.

Figure 9:
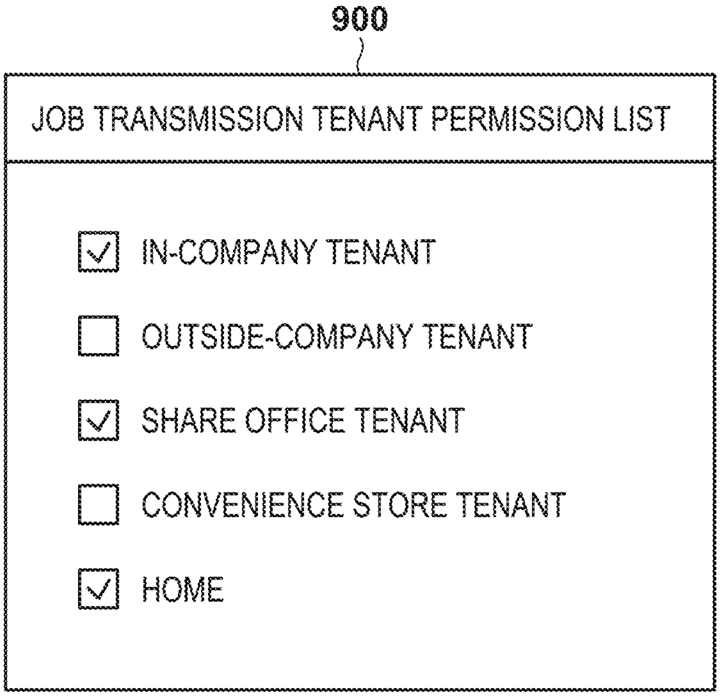
FIG. 9 is a diagram illustrating an example of output-enabled tenant conditions according to the first embodiment.

Having received the request, the CPS 220 transmits the output-enabled tenant condition set for itself to the CPS 240 (S705). The output-enabled tenant condition will be described in detail using FIG. 9. FIG. 9 illustrates examples of output-enabled tenant conditions according to the present embodiment. In the present example described herein, the output-enabled tenant conditions are set for the CPS 220. However, an output-enabled tenant condition is also stored in the CPS 221, the CPS 230, and the CPS 231. An output-enabled tenant condition 900 indicates the types of tenants that are allowed to print via the public tenant, and this may be set for each tenant. Also, the set content may be different between tenants. The output-enabled tenant condition 900 stored by the CPS 220 defines that output to the in-company tenant, the shared office tenant, and to the home is enabled. In other words, the tenants that can input a print job from the client terminal 200 are defined as the in-company tenant, the shared office, and the home.

Having received the output-enabled tenant condition, the CPS 240 filters the output-enabled tenants on the basis of the user information illustrated in FIG. 6 and the output-enabled tenant condition and generates an output-enabled tenant list (S706). For example, in a case where the operation target user is "User A" in FIG. 6, the tenants registered in association with this user are "Company A", "Company B", "Convenience Store", and "Home". Using the output-enabled tenant condition 900 as an example, we see that the outside-company tenant and convenience store tenant are not output-enabled. Thus, the output-enabled list corresponds to "Company A" and "Home" which are the registered tenants that match the output-enabled tenant condition.

Note that the names of the tenants illustrated in FIG. 6 are different to the types of tenants illustrated in FIG. 9, and to associate these together, in addition to the tenant name of the user information, a tenant type may be stored as tenant information, for example. The tenant types may be the types listed in FIG. 9, and the output-enabled tenants may be filtered by tenant type. Alternatively, a naming convention may be used in which the type is included in the name of the tenant. The CPS 240 transmits the generated output-enabled tenant list to the client terminal 200 (S707).

Figure 8:
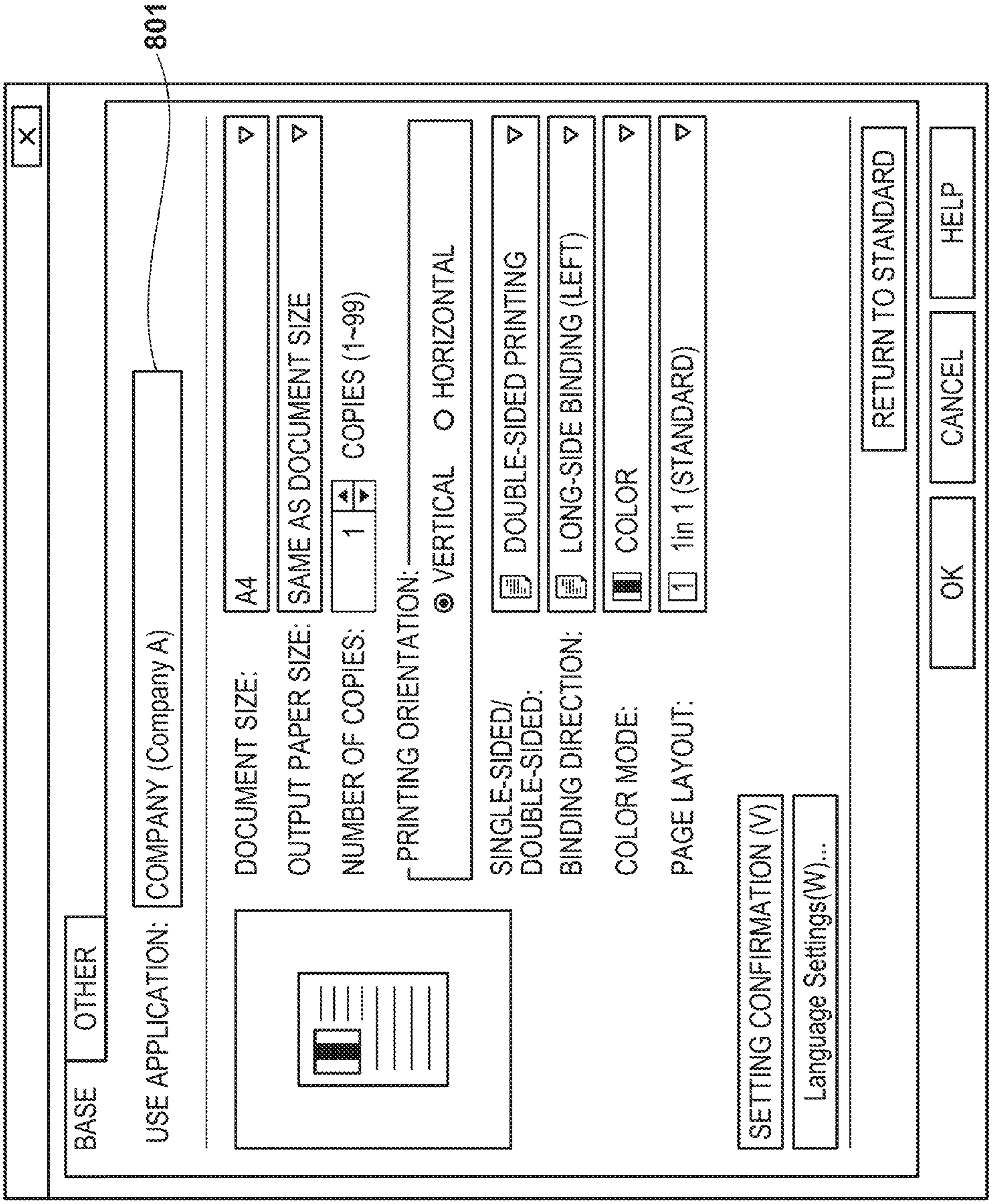
FIG. 8 is a diagram illustrating an example of a print settings screen according to the first embodiment.

Having received the output-enabled tenant list, the client terminal 200 applies the updates to the obtained output-enabled tenant list and displays the print settings screen (S708). FIG. 8 illustrates an example of the displayed print settings screen. A use application item 801 in FIG. 8 represents the updated output-enabled list generated in S706. In the use application item 801, the names of the tenants included in the output-enabled tenant list are displayed via a pull down menu, for example. The user selects an output destination tenant from the list of output-enabled tenants displayed in the use application item 801 of the print settings screen and inputs a printing instruction. When the client terminal 200 receives this input (S709), the client terminal 200 transmits a print job together with the output destination tenant information to the CPS 240 (S710).

Having received the print job, the CPS 240 transmits the print job to the received output destination tenant (S711). Having received the print job, the tenant (in the present example, the CPS 220) stores the print job and waits until a print job request arrives from the affiliated image forming apparatus 210. When a print job request is received from the image forming apparatus 210 affiliated with the selected output destination tenant, the print job selected from among the print jobs allowed to be printed by the user who requested them is transmitted to the image forming apparatus 210. The image forming apparatus 210 executes the received print job and performs printing.

Flow of Affiliated Identification of Client Terminal

Figure 11:
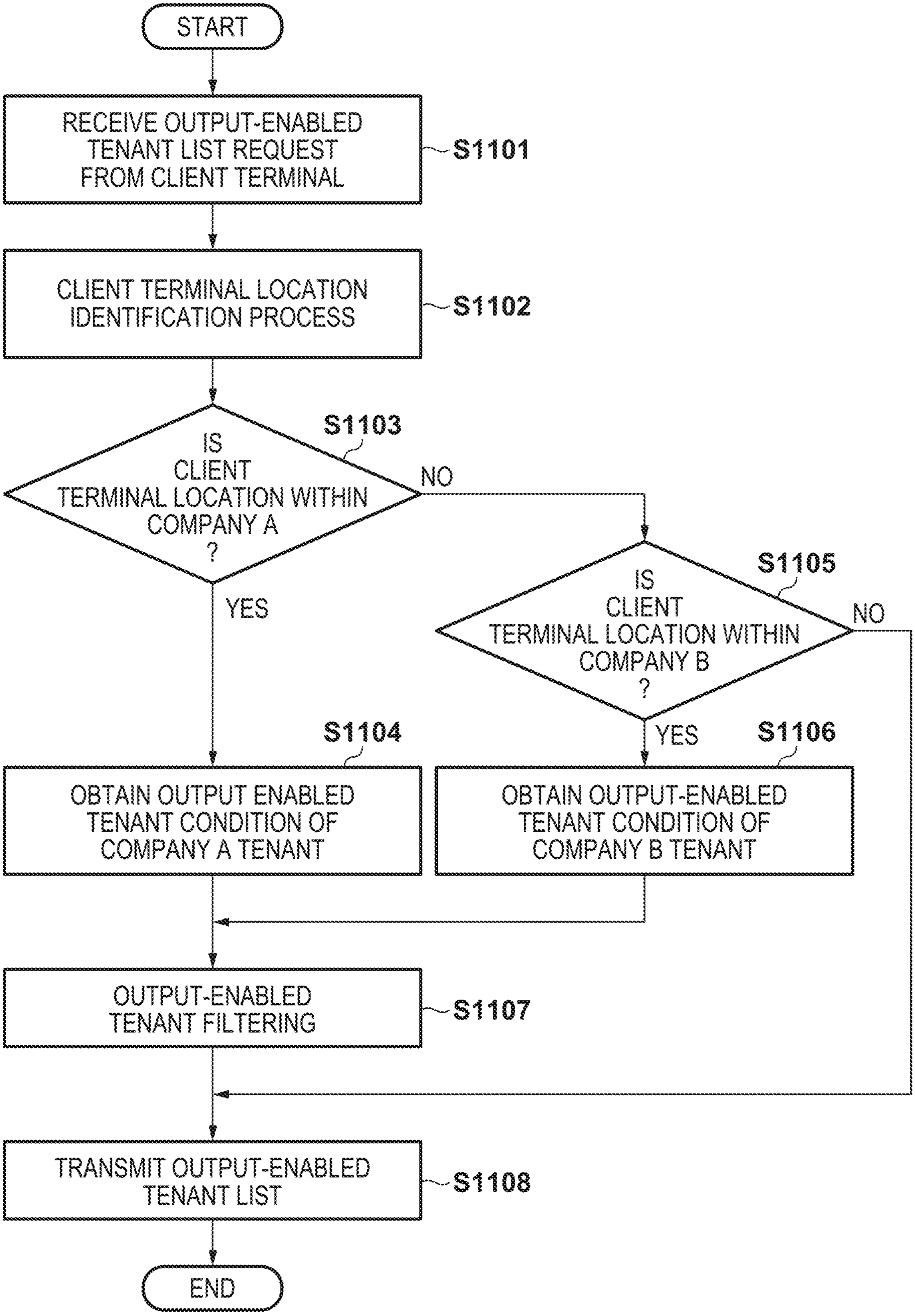
FIG. 11 is a flow diagram for identifying the affiliation of the client terminal according to the first embodiment.

FIG. 11 is a flow diagram for identifying the affiliation of a client terminal according to the present embodiment. The present process described here is a detailed description of S703 to S706 in FIG. 7. Note that the present process is mainly executed by the CPS 240. Also, the present embodiment is premised on the CPS 220, which is the company A tenant, and the CPS 221, which is the company B tenant, being connected to the CPS 240 as company tenants. However, the configuration is not limited to this configuration, and other tenants such as a company C tenant, a company D tenant, or the like may also be connected. In this case, the process can be implemented by additionally executing the process of S1103 and S1104 with the company A tenant as the target for the number of connected tenants.

First, the output-enabled tenant list request is received by the client terminal 200 (S1101). At the timing when this is received, a location identification process of the client terminal 200 is executed (S1102). Specific methods for the location identification process include using the IP address of the client terminal 200, position information (GPS), and the like. Also, printer driver obtains specific in-company information set in advance in the client terminal 200, and by transmitting this information together with the print job to the CPS 240, the affiliated tenant can be identified. Then, the location information can be identified. In the process according to the present embodiment described herein, as an example, the IP address is used to identify its location.

Figure 10:
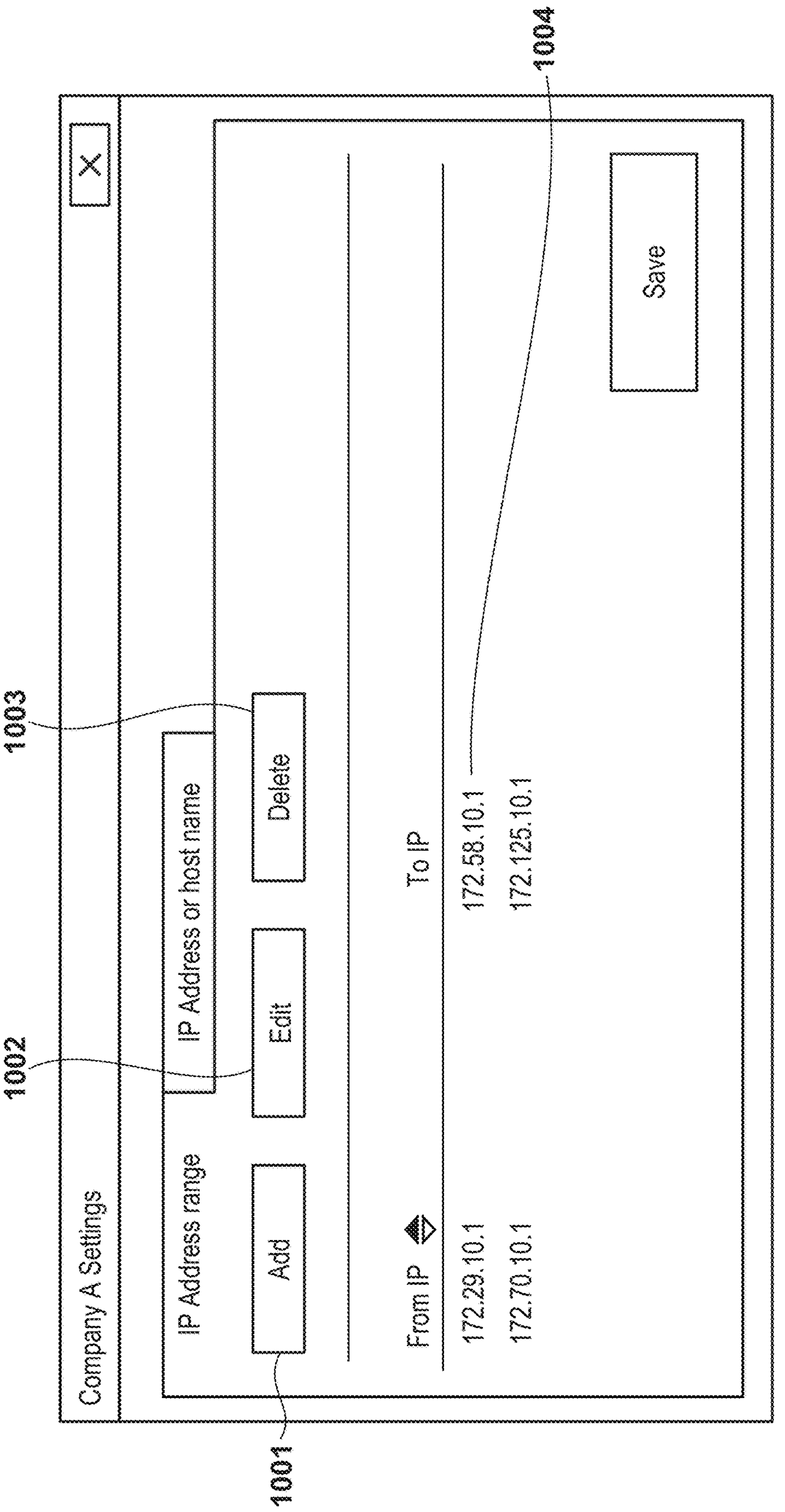
FIG. 10 is a diagram illustrating an example of a settings screen for defining the IP address range for identifying the location of a client terminal according to the first embodiment.

FIG. 10 illustrates an example of a settings screen for defining the IP address range for identifying the location of the client terminal according to the first embodiment. In this example, the settings screen is on a tenant of the company A tenant CPS 220. When the tenant administrator clicks Add button 1001 and inputs a start IP address and an end IP address, it is set up to determine a terminal with an IP address in this range as the client terminal 200 in the company. The IP address range can be corrected with Edit button 1002. Also, the set of the start IP address and the end IP address can be deleted with Delete button 1003. The added IP address range sets are displayed in a display area 1004. When a tenant and its IP address range are generated, the CPS 220 transmits them to the CPS 240 registered as a user, referencing S1102 of FIG. 11. Alternatively, before S1102, the CPS 240 may request the tenant and its IP address range from the CPS 220 and obtain these. The output-enabled tenant condition may also be obtained at this time, or the CPS 240 may perform generation instead of the CPS 220.

In a case where the location of the client terminal 200 is determined to be in company A (Yes in S1103), the output-enabled tenant condition of the company A tenant is obtained from the CPS 240 (S1104). The output-enabled tenants are filtered on the basis of the obtained output-enabled tenant condition (S1107), and the result is transmitted to the client terminal 200 as an output-enabled tenant list (S1108). On the other hand, in a case where the location of the client terminal 200 is determined to be outside of company A (No in S1103), in a similar manner, the IP address range of company B is checked, and whether or not the client terminal 200 is in company B is checked (S1105). In a case where the location of the client terminal 200 is determined to be in company B (Yes in S1105), the output-enabled tenant condition of the company B tenant is obtained from the CPS 240 (S1106). The output-enabled tenants are filtered on the basis of the obtained list (S1107), and the result is transmitted to the client terminal 200 as an output-enabled tenant list (S1108). On the other hand, in a case where the location of the client terminal 200 is determined to be outside company B (No in S1105), output-enabled tenant filtering is not performed, and the output-enabled tenant list in which the user is registered is transmitted unchanged (S1108).

In this manner, in a case where a print job can be transmitted to a plurality of cloud printing services, an intermediary cloud printing service generates a list of output-enabled cloud printing services. By having a user select a cloud printing service for output from this list, the administrator can restrict the tenants that the user can transmit to when printing. In this manner, management of the payer of printing and management to ensure print jobs are not leaked outside of the company can be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-076895, filed May 8, 2023, which is hereby incorporated by reference herein in its entirety.

What is claimed is:

1. An information processing apparatus, comprising:

a communication unit;

at least one memory storing at least one program; and at least one processor, wherein the at least one processor reads out the at least one program from the at least one memory and executes the at least one program to:

in response to a request for an output-enabled tenant list by a user, identify a location of a client terminal corresponding to a transmission source of the request, in a case where the location is determined to be a location of a specific tenant, obtain a condition for an output-enabled tenant set for the specific tenant, the condition including types of output-enabled tenants, filter a list of output-enabled tenants usable by the user on a basis of the condition by excluding tenants whose types do not match the types indicated by the condition to generate an output-enabled tenant list and transmit the output-enabled tenant list to the client terminal, and transfer, to a storage service of an output destination tenant, a print job received from the client terminal, and wherein the output destination tenant is selected by the user of the client terminal and the print job stored in the storage service is printed based on a job request received from an image forming apparatus affiliated with the output destination tenant.

2. The information processing apparatus according to claim 1, wherein the condition is a list indicating types of output-enabled tenants.

3. The information processing apparatus according to claim 2, wherein the types of output-enabled tenants include in-company tenant, outside-company tenant, public tenant, and home management tenant.

4. The information processing apparatus according to claim 1, wherein in a case where the location is determined to not be a location of a specific tenant, a list of output-enabled tenants usable by the user is transmitted to the client terminal as the output-enabled tenant list.

5. The information processing apparatus according to claim 1, wherein the at least one processor receives an IP address of the client terminal from the client terminal and, if the IP address is in an IP address range set for the specific tenant, determines that a location of the client terminal is a location of the specific tenant.

6. The information processing apparatus according to claim 1, wherein the at least one processor receives, via the communication unit, a setting for an IP address range for the specific tenant from a printing service set with the specific tenant.

7. The information processing apparatus according to claim 1, wherein the at least one processor further accepts a setting for an IP address range for the specific tenant from a user.

8. The information processing apparatus according to claim 1, wherein the at least one processor obtains a condition for an output-enabled tenant set for the specific tenant from a printing service set with the specific tenant.

9. A printing system, comprising:

an information processing apparatus;

a client terminal; and a printing service set with a specific tenant, wherein the information processing apparatus includes:

a communication unit, at least one memory storing at least one program, and at least one processor, and wherein the at least one processor reads out the at least one program from the at least one memory and executes the at least one program to:

in response to a request for an output-enabled tenant list by a user, identify a location of a client terminal corresponding to a transmission source of the request, in a case where the location is determined to be a location of a specific tenant, obtain a condition for an output-enabled tenant set for the specific tenant, and the condition including types of output-enabled tenants, filter a list of output-enabled tenants usable by the user on a basis of the condition by excluding tenants whose types do not match the types indicated by the condition to generate an output-enabled tenant list and transmit the output-enabled tenant list to the client terminal, and transfer, to a storage service of an output destination tenant, a print job received from the client terminal, and wherein the output destination tenant is selected by the user of the client terminal and the print job stored in the storage service is printed based on a job request received from an image forming apparatus affiliated with the output destination tenant.

10. A non-transitory computer-readable storage medium storing a program that causes a computer to execute a process when loaded and executed on the computer, the process including:

in response to a request for an output-enabled tenant list by a user, identifying a location of a client terminal corresponding to a transmission source of the request, in a case where the location is determined to be a location of a specific tenant, obtaining a condition for an output-enabled tenant set for the specific tenant, the condition including types of output-enabled tenants, filtering a list of output-enabled tenants usable by the user on a basis of the condition by excluding tenants whose types do not match the types indicated by the condition to generate an output-enabled tenant list and transmitting the output-enabled tenant list to the client terminal, and transferring, to a storage service of an output destination tenant, a print job received from the client terminal, wherein the output destination tenant is selected by the user of the client terminal and the print job stored in the storage service is printed based on a job request received from an image forming apparatus affiliated with the output destination tenant.

11. A control method performed by an information processing apparatus configured to communicate with a client terminal, comprising:

in response to a request for an output-enabled tenant list by a user, identifying a location of a client terminal corresponding to a transmission source of the request, in a case where the location is determined to be a location of a specific tenant, obtaining a condition for an output-enabled tenant set for the specific tenant, the condition including types of output-enabled tenants, filtering a list of output-enabled tenants usable by the user on a basis of the condition by excluding tenants whose types do not match the types indicated by the condition to generate an output-enabled tenant list and transmitting the output-enabled tenant list to the client terminal, and transferring, to a storage service of an output destination tenant, a print job received from the client terminal, wherein the output destination tenant is selected by the user of the client terminal and the print job stored in the storage service is printed based on a job request received from an image forming apparatus affiliated with the output destination tenant.

* * * * *